US007484334B1

(12) United States Patent
Oviedo-Reyes

(10) Patent No.: US 7,484,334 B1
(45) Date of Patent: Feb. 3, 2009

(54) ROOF ANCHORING KIT AND METHOD

(76) Inventor: Alfonso Oviedo-Reyes, 8370 W. Flagler St., Suite 110, Miami, FL (US) 33144

( * ) Notice: Subject to any disclaimer, the term of this patent is extended or adjusted under 35 U.S.C. 154(b) by 171 days.

(21) Appl. No.: 11/237,615

(22) Filed: Sep. 28, 2005

(51) Int. Cl.
 *E04B 7/18* (2006.01)
 *E04D 1/34* (2006.01)
(52) U.S. Cl. ............. 52/23; 52/4; 52/92.1; 52/DIG. 11; 52/DIG. 12
(58) Field of Classification Search .............. 52/23, 52/92.1, 92.2, 92.3, 93.1, 655.1, 4, 3, 148, 52/293.3, DIG. 11, DIG. 12
See application file for complete search history.

(56) References Cited

U.S. PATENT DOCUMENTS

| | | | | | |
|---|---|---|---|---|---|
| 352,424 | A | * | 11/1886 | Owen et al. ..................... | 52/23 |
| 828,616 | A | * | 8/1906 | Louden ....................... | 403/394 |
| 1,192,027 | A | * | 7/1916 | Acheson ........................ | 52/23 |
| 3,449,874 | A | * | 6/1969 | Beaupre ....................... | 52/149 |
| 3,914,910 | A | * | 10/1975 | Struben ........................ | 52/160 |
| 4,592,186 | A | * | 6/1986 | Braginetz ..................... | 52/699 |
| 5,388,378 | A | * | 2/1995 | Frye ............................... | 52/23 |
| 5,522,184 | A | * | 6/1996 | Oviedo-Reyes ................ | 52/23 |
| 5,570,545 | A | * | 11/1996 | Adams ........................... | 52/23 |
| 5,623,788 | A | * | 4/1997 | Bimberg et al. ................ | 52/23 |
| 5,687,512 | A | * | 11/1997 | Spoozak et al. ................ | 52/23 |
| 5,819,477 | A | * | 10/1998 | Gaffney ......................... | 52/23 |
| 5,983,572 | A | | 11/1999 | Laboy | |
| 6,227,329 | B1 | * | 5/2001 | Ador ............................. | 182/3 |
| 6,763,634 | B1 | | 7/2004 | Thompson | |
| 6,865,852 | B2 | * | 3/2005 | Gower .......................... | 52/222 |
| 2002/0166289 | A1 | * | 11/2002 | Oviedo-Reyes .................. | 52/4 |
| 2004/0118053 | A1 | | 6/2004 | Huppert | |
| 2005/0279465 | A1 | * | 12/2005 | Gower ..................... | 160/368.1 |

* cited by examiner

*Primary Examiner*—Robert J Canfield
*Assistant Examiner*—Christine T Cajilig
(74) *Attorney, Agent, or Firm*—Frank L. Kubler

(57) ABSTRACT

A roof anchoring kit includes a number of bracing plates, each bracing plate having two spaced apart plate ports, for placing on top of a roof panel; a number of loop forming members passing through the opposing plate ports of each bracing plate, and for passing through openings in an abutting roof panel and around a corresponding roof beam below the bracing plate, and for tying to form a loop securing the corresponding bracing plate, the adjacent roof panel and roof beam together; a number of tie down lines connected to a linear series of the loop forming members and extending across the roof and then down to part of one of a building wall and a foundation or to where the end of the tie down line is tied; and a number of crossing lines extending perpendicular to the tie down lines and connected to a series of the loop forming members on a series of roof beams, where ends of the tie down lines and crossing lines are anchored.

11 Claims, 1 Drawing Sheet

ROOF ANCHORING KIT AND METHOD

BACKGROUND OF THE INVENTION

1. Field of the Invention

The present invention relates generally to the field of devices for safeguarding buildings from storm damage. More specifically the present invention relates to a roof anchoring kit for securing a roof and roof elements against movement and dislodgement when subjected to the forces hurricane and other storm winds. The kit includes several metal bracing members which preferably although not necessarily are rectangular and planar bracing plates, each having a spaced apart pair of loop passing plate ports at opposing plate ends, for placing on top of a roof panel or decking; a loop forming member for passing through the opposing plate ports of each bracing plate, passing through openings formed in the abutting roof panel, and around a roof beam immediately below the bracing plate and the decking panel and preferably through an anchoring ring, thereby suspending the anchoring ring below the roof beam, the loop forming member made of any material but preferably made of steel cables or steel or plastic bands or straps being tied to form a loop securing the bracing plate, roof panel and roof beam and preferably the anchoring rings together. While the concept of this invention could be workable without the use of the bracing plates placed above the decking panel, this would only reduce the efficiency of the kit to resist winds. The kit includes a number of tie down lines for passing through a linear series of the anchoring rings such as along a roof beam and extending the width or length of the roof and then down opposing sides of the building to the cross beam or to the columns or to the building's foundation or to an anchoring structure buried in the ground to which the ends of the tie down line are tied. The tie-down lies are to be given tension by means of turnbuckles or other means for tensioning same. Other tie-down lines run across the beams of the roof forming a square pattern that further anchors the system. The bracing plates and anchoring rings preferably are formed of corrosion resistant metal, and the loop forming members and tie down lines preferably are cables of suitable gauge. The invention would also work without the plates, but it would be less efficient to the purpose that is sought to serve namely obtaining the optimum resistance of the decking to the winds. Finally, there are other tie-down lines which run across the anchoring rings but perpendicular to the beams of the roof. These last mentioned tie-down lines form squares with the formerly mentioned lines that run under the beams of the roof. These lines are the elements that give the system its last structural element. This system can also be used to secure panels of siding on the walls of buildings or any other elements that need securing to the main building structure.

A series of parallel tie down lines extend below a corresponding series of roof beams and the anchored bracing plates firmly abut the roof panels of the decking to hold down the roof in high wind. The roof beams are illustrated to be the top members of roof trusses, although many other forms of roof beams are suitable. The roof panel or decking panels in many instances would be a plywood panel, although virtually any other type of panel would be suitable as well. A method of kit installation is also provided.

2. Description of the Prior Art

There have long been devices and assemblies for securing portions of buildings against high storm winds.

Thompson, U.S. Pat. No. 6,763,634, issued on Jul. 20, 2004, discloses a retrofit hurricane-earthquake clip for connecting to a roof rafter. The Thompson clip is formed of sheet metal and includes a U-shaped straddle for fitting around a beam or rafter, the straddle having fastener ports for securing the straddle to the beam, and includes a flat plate connected to the straddle for placement against a building wall adjacent and perpendicular to the beam, the plate having fastener ports for securing the plate to the building wall.

Spoozak, et al., U.S. Pat. No. 5,687,512, issued on Nov. 18, 1997, teaches a hurricane lockdown system for a low rise building with a roof structure having sheathing secured over roof rafters and forming eaves around the periphery of the roof. Spoozak, et al., includes a loop of rafter cable for securing around the eaves, several anchor cables secured to the rafter and extending vertically to the ground and brackets for securing the cable upper ends to the rafters.

Huppert, U.S. Patent Application Publication Number 2004/0118053 A1 filed on Jun. 24, 2004, reveals a truss anchoring assembly for buildings. Huppert includes a U-shaped bracket for fitting over and securing to part of a truss or roof frame and an extension rod for extending from the gusset downwardly to the building foundation.

Gaffney, U.S. Pat. No. 5,819,477, issued on Oct. 13, 1998, discloses an apparatus and method for securing a building having a roof. Gaffney includes several ground anchors planted around the periphery of the building and several lines for routing over the building and securing t the ground anchors, and netting material spanning the lines at the roof and optionally at least one cinch transversely spanning the lines at the roof of the building.

Laboy, U.S. Pat. No. 5,983,572, issued on Nov. 16, 1999, reveals a roof tie-down support member. Laboy includes cables crossing over the roof parallel to the peak and periodically placed support members with opposing legs or wing portions for resting on the roof and channels between the wing portions for guiding and retaining the cables.

Bimberg, et al., U.S. Pat. No. 5,623,788, issued on Apr. 29, 1997, teaches a roof anchoring apparatus. Bimberg, et al., includes a roof-pressing assembly for placement on a building roof.

It is thus an object of the present invention to provide a roof anchoring kit which can be installed on most existing home and other roofs with minimal roof preparation.

It is another object of the present invention to provide such a roof anchoring kit which anchors the roof uniformly along its width and length so that it is secured firmly, reliably and over its entire area.

It is still another object of the present invention to provide such a roof anchoring kit with a method of installation on a roof which is relatively easy to practice and requires no special skills; and maybe retrofitted to existing roofs.

It is still another object of the present invention to provide such a roof anchoring kit with a method of installation on a roof, which maintains the integrity of the architectural design and aesthetics of the home or building with no changes to the look or appearance of the same caused by the use of the kit.

It is still another object of the present invention to provide such a roof anchoring kit which is permanently installed and which requires no special preparations when storms approach because it is permanently affixed to the inside of the roof.

It is finally an object of the present invention to provide such a roof anchoring kit which is inexpensive to manufacture.

SUMMARY OF THE INVENTION

The present invention accomplishes the above-stated objectives, as well as others, as may be determined by a fair reading and interpretation of the entire specification.

A roof anchoring kit is provided, including a number of bracing plates, each bracing plate having two spaced apart plate ports, for placing on top of a roof panel; a number of loop forming members passing through the opposing plate ports of each bracing plate, and for passing through openings in an abutting roof panel and around a corresponding roof beam below the bracing plate and through an anchoring ring or rings, suspending the anchoring ring below the roof beam, and for tying to form a loop securing the corresponding bracing plate, the adjacent roof panel and roof beam and anchoring rings together; and a number of tie down lines for passing through a linear series of the anchoring rings so as along a roof beam and extending across the roof and then down to part of the building wall or foundation or to where the end of the tie down line is tied; where a series of the parallel tie down lines extend below corresponding roof beams and the anchored bracing plates hold down the roof in high wind.

The bracing plates and the anchoring rings preferably are formed of corrosion resistant metal. The loop forming members and the tie down lines preferably are metal cables. The tie down lines preferably each include a turnbuckle for adjusting tie down line tension.

A roof anchoring kit is further provided, including a number of bracing plates, each bracing plate having two spaced apart plate ports, for placing on top of a roof panel; a number of loop forming members passing through the opposing plate ports of each bracing plate, and for passing through openings in an abutting roof panel and around a corresponding roof beam below the bracing plate, and for tying to form a loop securing the corresponding bracing plate, the adjacent roof panel and roof beam together; and a number of tie down lines connected to a linear series of the loop forming members and extending across the roof and then down to part of one of a building wall and a foundation or to where the end of the tie down line is tied; where a series of parallel tie down lines extend below corresponding roof beams and the anchored bracing plates hold down the roof in high wind. The roof anchoring kit preferably additionally includes a number of anchoring rings interconnecting the number of tie down lines and the linear series of the loop forming members.

A roof and roof anchoring kit is still further provided, including a roof resting on a building and including a roof beam and a roof panel secured on top of roof beam; a number of bracing structures, each bracing structure having two spaced apart structure ports, for placing on top of the roof panel; a number of loop forming members passing through the opposing structure ports of each bracing structure, and for passing through openings in an abutting roof panel and around the roof beam below the bracing structure, and for tying to form a loop securing the corresponding the bracing structure, the roof panel and the roof beam together; and a number of tie down lines connected to a linear series of the loop forming members along the roof beam and extending across the roof and then down to part of one of a building wall and a foundation or to where the end of the tie down line is tied; where a series of parallel said tie down lines extend below the roof beam and said anchored bracing structures hold the roof down in high wind. The bracing structure preferably is a metal plate. The tie down lines each preferably include a turnbuckle for adjusting tie down line tension.

A method is provided of securing a roof including a roof panel and a roof beam below the panel with an roof anchoring kit having a number of bracing plates, each bracing plate having two spaced apart plate ports, for placing on top of a roof panel; a number of loop forming members passing through the opposing plate ports of each bracing plate, and for passing through openings in an abutting roof panel and around a corresponding roof beam below the bracing plate, and for tying to form a loop securing the corresponding bracing plate, and the adjacent roof panel and roof beam together; and a number of tie down lines are connected to a linear series of the loop forming members such as along a roof beam and extending across the width of the roof and then down to part of the building wall or foundation or to where the end of the tie down line is tied; wherein a series of parallel tie down lines extend below corresponding roof beams and the anchored bracing plates hold down the roof in high wind, including the steps of: providing several anchoring plates and placing the anchoring plates on top of roof panels resting on roof beams; providing panel openings in the roof panels registering with the plate ports; fitting a loop forming member through the spaced apart plate ports in each anchoring plate and around the adjacent roof beam and tying the loop forming members to form secure closed loops tying together the anchoring plates, corresponding roof panel and roof beam; and interconnecting at least one series of the loop forming members with a tie down line, each tie down line being secured at each end to an anchoring structure.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
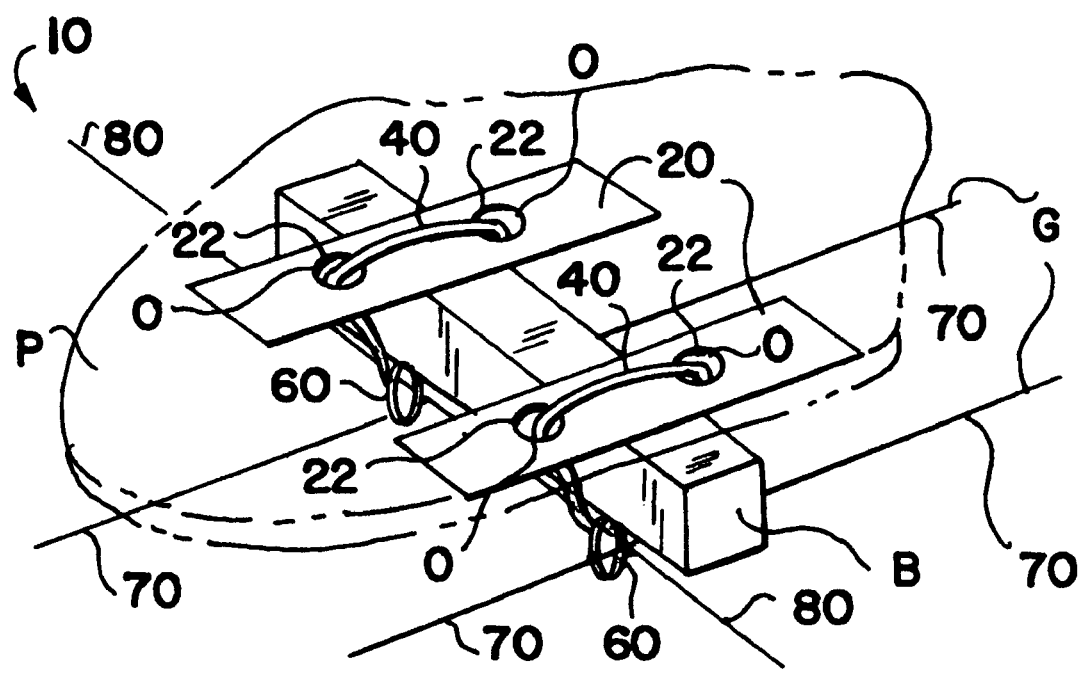
FIG. 1 is a close-up perspective view of a segment of a roof beam and a broken away section of roof panel on top of the roof beam fitted with elements of the roof anchoring kit, including two bracing plates on top of the roof panel and a loop forming member passing through spaced apart bracing plate ports of each bracing plate and through registering openings in the roof panel and wrapping around the roof beam and through an anchoring ring. A tie down line and two crossing lines forming a grid are also shown, passing through the anchoring rings in perpendicular relation.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 2:
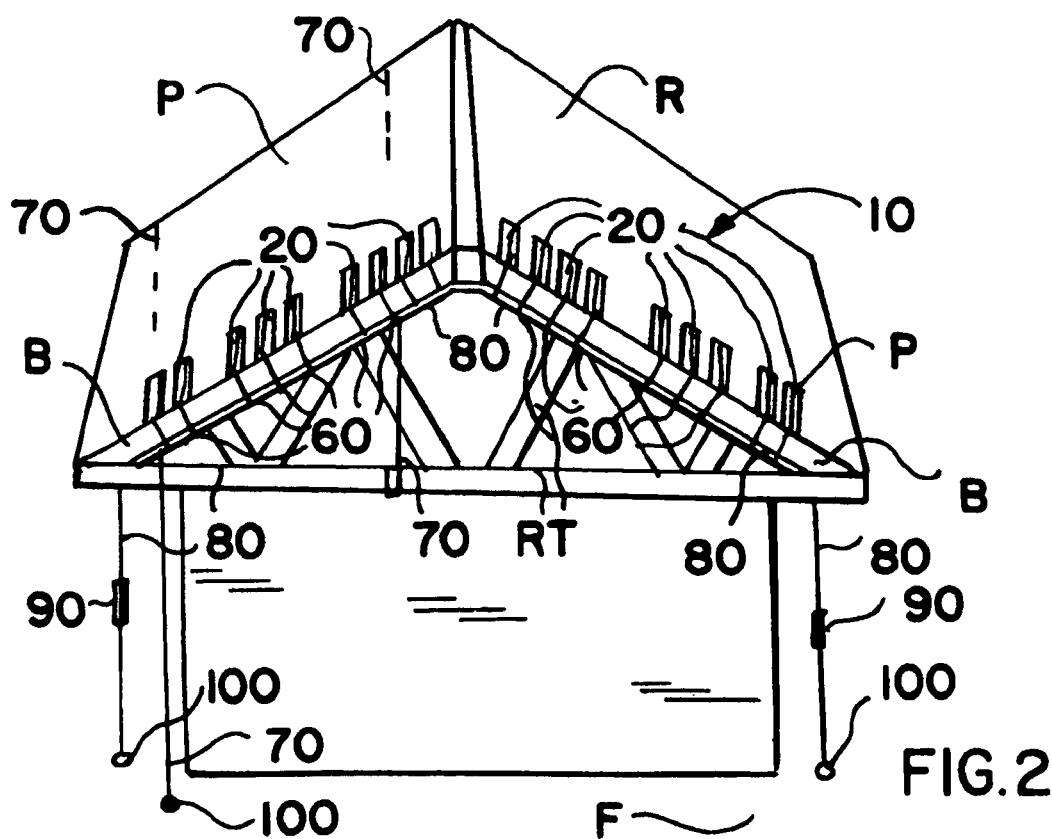
FIG. 2 is a perspective view of a building and building roof fitted with the preferred embodiment of the roof anchoring kit.

Referring to FIGS. 1-2, a roof anchoring kit 10 is disclosed for securing a roof against hurricane and other storm winds. Kit 10 includes several rectangular bracing plates 20, each having a spaced apart pair of loop passing plate ports 22 at opposing plate 20 ends, for placing on top of a roof panel P; a loop forming member 40 for passing through the opposing plate ports 22 of each bracing plate 20; passing through panel openings O formed in the abutting roof panel P and around a roof beam B immediately below the bracing plate 20, and preferably through at least one anchoring ring 60, thereby suspending the anchoring ring 60 below the roof beam B, the loop forming member 40 being tied to form a loop tying together the bracing plate 20, roof panel P and roof beam B and optionally the anchoring ring 60 together. Finally, a number of tie down lines 80 are provided, each for passing through a linear series of the anchoring rings 60 such as along a roof beam B and extending the width or length of the roof R and then down opposing sides of the building to the foundation F or to an anchoring structure 100 buried in the ground to which the ends of the tie down line 80 are tied. Alternatively, anchoring rings 60 may be omitted and the tie down lines 80 simply passed through a linear series of the loop forming members 40. The tie down lines 80 preferably each include at least one turn buckle 90 to provide suitable tension in the tie down lines 80 to fully secure the roof R. The bracing plates 20 and anchoring rings 60 preferably are formed of corrosion resistant metal, and the loop forming members 40 and tie down lines 80 preferably are metal cables of suitable gauge.

A series of parallel tie down lines 80 extend below a corresponding series of roof beams B and the anchored bracing plates 20 hold down the roof R in high wind. The roof beams B are illustrated to be the top members of roof trusses RT, although many other forms of roof beams B are suitable. The roof panel P in many instances would be a plywood panel, although virtually any other type of roof panel P would be suitable as well.

METHOD

In practicing the invention, the following method may be used. The method includes the steps of providing several anchoring plates 20 and placing them on top of roof panels P resting on roof beams B; providing panel openings O in the roof panels P registering with the plate, ports 22 such as by positioning a drill bit within each of the plate ports 22 and drilling into the panels P; fitting a loop forming member 40 through the spaced apart plate ports 22 in each anchoring plate and around the adjacent roof beam B and tying the loop forming members 40 to form secure closed loops tying together the anchoring plates 20, corresponding roof panel P and roof beam B; and interconnecting at least one series of loop forming members 40 with a tie down line 80, each tie down line 80 being secured at each end to an anchoring structure 100. Preferred additional steps are to provide anchoring rings 60 and pass each loop forming member 40 through an anchoring ring 60 in addition to the corresponding anchoring plate 20, roof panel P and roof beam B, and then passing tie down lines 80 through a series of the anchoring rings 60. Alternatively an additional step would be to pass the tie down line 80 through a series of the loop forming members 40. Additional tie down crossing lines 70 intersect the tie down lines 80, passing through series of anchoring rings 60 on the series of roof beams B and pass under the beams B forming a grid G in combination with the tie down lines 80 defining a shape mimicking the shape of the roof R. Ends of the crossing lines 70 preferably are anchored to lateral sides of the roof R in gables of the roof R or to anchoring elements that anchor the gables to the roof R. The grid G in most instances would be square, but in some instances will take other shapes such as where the roof R is conical the grid G will be conical as well.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A roof anchoring kit, comprising:
    a plurality of bracing plates, each said bracing plate having two spaced apart plate ports, for placing on top of a roof panel;
    a loop forming member passing through the opposing plate ports of each bracing plate, and for passing through openings in an abutting roof panel and around a corresponding roof beam below said bracing plate and through an anchoring ring, suspending said anchoring ring below the roof beam, and for tying to form a loop securing the corresponding said bracing plate, the adjacent roof panel and roof beam and anchoring ring together;
    and a plurality of tie down lines for passing through a linear series of the anchoring rings and extending across the roof and then down to part of one of a building wall and a building foundation or to where the end of the tie down line is tied;
    wherein a series of parallel said tie down lines extend below corresponding roof beams and said anchored bracing plates hold down the roof in high wind.

2. The roof anchoring kit of claim 1, wherein said bracing plates and said anchoring rings are formed of corrosion resistant metal.

3. The roof anchoring kit of claim 1, wherein said loop forming members and said tie down lines are one of metal cables, metal strips, and plastic strips.

4. The roof anchoring kit of claim 1, wherein said tie down lines each comprise a turnbuckle for adjusting tie down line tension.

5. A roof anchoring kit, comprising:
    a plurality of bracing plates, each said bracing plate having two spaced apart plate ports, for placing on top of a roof panel;
    a loop forming member passing through the opposing plate ports of each bracing plate, and for passing through openings in an abutting roof panel and around a corresponding roof beam below said bracing plate, and for tying to form a loop securing the corresponding said bracing plate, the adjacent roof panel and roof beam together;
    and a plurality of tie down lines connected to a linear series of said loop forming members and extending across the roof and then down to part of one of a building wall and a foundation and to where the end of the tie down line is tied;
    wherein a series of parallel said tie down lines extend below corresponding roof beams and said anchored bracing plates hold down the roof in high wind.

6. The roof anchoring kit of claim 5, additionally comprising a plurality of anchoring rings interconnecting the plurality of said tie down lines and the linear series of said loop forming members.

7. A roof and roof anchoring kit, comprising:
    a roof resting on a building and comprising a roof beam and a roof panel secured on top of said roof beam;
    a plurality of bracing structures, each said bracing structure having two spaced apart structure ports, for placing on top of said roof panel;

a loop forming member passing through the opposing structure ports of each bracing structure, and for passing through openings in an abutting roof panel and around said roof beam below said bracing structure, and for tying to form a loop securing the corresponding said bracing structure, said roof panel and said roof beam together;

and a plurality of tie down lines connected to a linear series of said loop forming members along said roof beam and extending across said roof and then down to part of one of a building wall and a foundation and to where the end of the tie down line is tied;

wherein a series of parallel said tie down lines extend below said roof beam and said anchored bracing structures hold said roof down in high wind.

8. The roof and roof anchoring kit of claim 7, wherein said bracing structure is a metal plate.

9. The roof and roof anchoring kit of claim 7, wherein said tie down lines each comprise a turnbuckle for adjusting tie down line tension.

10. The roof and roof anchoring kit of claim 7, additionally comprising at least one crossing line for extending across said plurality of tie down lines and passing through a linear series of the anchoring rings on a series of roof beams and extending along the roof and then down to part of one of a building wall and a building foundation or to where the end of the tie down line is tied.

11. A method of securing a roof comprising a roof panel and a roof beam below the panel with an roof anchoring kit comprising a plurality of bracing plates, each bracing plate having two spaced apart plate ports, for placing on top of a roof panel; a plurality of loop forming members passing through the opposing plate ports of each bracing plate, and for passing through openings in an abutting roof panel and around a corresponding roof beam below the bracing plate, and for tying to form a loop securing the corresponding bracing plate, and the adjacent roof panel and roof beam together; and a plurality of tie down lines connected to a linear series of the loop forming members along a roof beam and extending across the width of the roof and then down to part of one of a building wall and building foundation or to where the end of the tie down line is tied; wherein a series of parallel tie down lines extend below corresponding roof beams and the anchored bracing plates hold down the roof in high wind, comprising the steps of:

providing several anchoring plates and placing the anchoring plates on top of roof panels resting on roof beams;

providing panel openings in the roof panels registering with the plate ports;

fitting a loop forming member through the spaced apart plate ports in each anchoring plate and around the adjacent roof beam and tying the loop forming members to form secure closed loops tying together the anchoring plates, corresponding roof panel and roof beam;

and interconnecting at least one series of the loop forming members with a tie down line, each tie down line being secured at each end to an anchoring structure.

* * * * *